United States Patent Office 3,452,077
Patented June 24, 1969

3,452,077
AMMOXIDATION OF ALKYLATED AROMATIC HYDROCARBONS TO AROMATIC NITRILES USING A HETEROPOLYCOMPOUND AS A CATALYST
Giorgio Caporali, Natale Ferlazzo, Nicola Giordano, and Franco Faletti, Milan, Italy, assignors to Montecatini Edison S.p.A., Milan, Italy
No Drawing. Filed Sept. 8, 1966, Ser. No. 577,807
Claims priority, application Italy, Sept. 22, 1965, 21,089/65
Int. Cl. C07c 121/62, 121/02, 121/54
U.S. Cl. 260—465                                6 Claims

ABSTRACT OF THE DISCLOSURE

Aromatic nitriles are prepared via reaction among alkylated aromatic hydrocarbons, molecular oxygen and ammonia, in the presence of a catalytic system comprised of at least one heteropolycompound of the empirical formulae:

$$Me_x(Ce_yMo_{12}O_w)$$

and $$Me_x(Ce_yMo_{10}V_2O_w)$$

wherein Me is an element selected from the group consisting of tellurium and bismuth; $x$ is a number ranging from between 1 and 10; $y$ is a number ranging from between 1 and 8; and $w$ is a number ranging from between 38 and 82.

---

The present invention relates to a process for the preparation of nitriles and, more particularly, it relates to an improved process for the preparation of aromatic nitriles by means of catalysts containing a heteropolycompound.

In the prior technical literature there have already been described other processes for the preparation of aromatic nitriles by reacting in a vapour phase aromatic alkyl-substituted hydrocarbons with air and ammonia in the presence of suitable catalysts.

Many of the known processes do not afford fully satisfactory results; among the difficulties associated with the known processes there may be mentioned: relatively low selectivity, poor yields in desired nitrile, which is actually obtained together with great quantities of carbon oxide, and the formation of by-products and other products caused by the degradation of the aromatic ring.

Another disadvantage of the known processes is represented by the low conversion rates obtained therewith as a consequence of the ineffectiveness of the catalyst used. Still further disadvantages of the known processes reside in the facility with which the ammonia gives rise to secondary reactions with the catalyst at reaction temperatures, in the relatively long contact time among the reactants and in the particularly short life of the catalyst, so as to require frequent re-activation thereof.

Therefore, an object of the present invention is that of providing a process for the preparation of aromatic nitriles free of the above mentioned drawbacks via the reaction of an alkyl-substituted aromatic hydrocarbon, oxygen and ammonia.

Another object of this invention is that of providing a process for producing aromatic nitriles and the corresponding catalysts capable of affording particularly high yields.

A further object of this invention is to provide a process which permits of obtaining a high conversion rate, with a relatively short contact time without, however, negatively influencing the selectivity of the reaction.

Still another object of this invention is that of providing a process according to which the highest exploitation of the ammonia supplied is obtained, thereby avoiding losses of ammonia due to secondary reactions.

An additional object of this invention is to provide a process that permits use of the catalyst for long periods of time without loss in its activity, and therefore, without the need for frequent replacements or re-activation of the catalyst itself.

The process according to this invention offers considerable advantages with respect to the known processes.

A particular important advantage consists in the high degree of selectivity exhibited by the catalysts used in the process object of this invention.

The term "selectivity" must be understood to mean that secondary reactions take place only to a very minor extent and that, thus, only extremely small quantities of secondary products and of carbon oxides are formed. Moreover, and due to the absence of secondary reactions, which are highly exothermic, the thermal control of the process is relatively easy, thereby avoiding those particular expedients necessary for dissipating high reaction heats.

It is readily apparent that such an advantage brings with it a particularly satisfactory ease of operation.

These and still other objects which will be apparent to one skilled in the art from the following detailed description are achieved according to this invention by a process for obtaining aromatic nitriles by reacting in gaseous phase an alkyl-substituted aromatic hydrocarbon, ammonia and oxygen or an oxygen containing gas, in the presence of a catalytic system to be more precisely described hereinafter, at a temperature comprised in the range of from 350° C. to 600° C. and substantially at atmospheric pressure, with contact time ranging from 0.05 to 20 seconds.

The catalysts according to this invention may be considered as being derived from the salification of a particular heteropolyacid with an element selected from the group consisting of tellurium and bismuth.

As is known, heteropolyacids are considered as derived from two or more molecules of two or more different acids by elimination of water molecules (heterodiacids, heterotriacids, heterotetraacids); more particularly, they may be considered as being formed by the union of a certain number of molecules of acid anhydrides, particularly $WO_3$, $MoO_3$ and $V_2O_5$ (usually designated coordinated elements) with molecules of a second acid which will provide the central atom (usually defined as the co-ordinating element) of the said polyanionic complex.

Catalytically active heteropolyacids according to this invention are those which have as a co-ordinating element cerium, and, as a co-ordinated element, molybdenum either alone or in combination with vanadium.

The heteropolyacids of this type are commonly classed in the technical literature according to the ratio existing between the number of atoms of the co-ordinating element and the number of atoms of the co-ordinated element. To the catalytically active heteropolyacids, according to the invention, there may be attributed the following formulae:

$$H_8[Ce(Mo_2O_7)_5-(V_2O_6)] \text{ and } H_8[Ce(Mo_2O_7)_6]$$

These heteropolyacids are salified with one of the elements selected from the group consisting of tellurium and bismuth.

The salification is obtained through the reaction between a compound of the salifying element and the heteropolyacid or the ammonium salt of said heteropolyacid.

According to the invention, and in the salification of the heteropolyacid or of its ammonium salt, the compound of the salifying element may also be used in excess or in lesser amounts with respect to the quantity theoretically necessary.

It has now also been found that the catalysts prepared with the salifying element in excess or in lesser amounts are effective for carrying out the process according to this invention.

The heteropolycompounds used as catalysts in the process of this invention may be obtained in the following manner:

First, the desired heteropolyacid is prepared according to general methods described in the specialized literature for its preparation. The heteropolyacid thus obtained is then made to react with a compound of the desired salifying element in a liquid reaction medium and eventually in the presence of a small quantity of a strong mineral acid.

The compounds containing the salifying element are, according to the invention, oxides, hydroxides or salts of organic or inorganic acids of the elements bismuth and tellurium, preferably soluble in water or in dilute mineral acid. The heteropolyacid and the compound of the salifying element are then made to react in stoichiometric quantities in order to obtain the heteropolysalt of the desired element. However, even when using the salifying element in excess or in lesser amounts with respect to the quantity of acid to be salified, heteropolysalts are obtained that, like the former, fall within the following general formulae:

$$Me_x(Ce_yMo_{12}O_w); Me_x(Ce_yMo_{10}V_2O_w)$$

wherein: Me represents an atom of an element selected from the group consisting of tellurium and bismuth; $x$ represents a number comprised between 1 and 10; $y$ represents a number varying from 1 to 8; and $w$ represents a number comprised between about 38 and 82.

These heteropolycompounds proved to be efficient either as such or when supported on a suitable carrier. Furthermore, it has also been found that they are effective both in a fluid bed, as well as in a fixed bed.

The process and the catalysts according to this invention may be used for those benzene and naphthalene hydrocarbons in which at least one hydrogen atom of the benzene or naphthalene ring is substituted by an alkyl radical, such as, for example, a methyl, ethyl, isopropyl or isobutyl radical.

Thus, for instance, benzonitrile is obtained from toluene, from ethylbenzene, from isopropylbenzene, from tert-butylbenzene and the corresponding methylbenzonitriles, or the corresponding benzodinitriles are obtained from the xylenic isomers.

The process and the catalysts according to this invention are particularly efficient and afford excellent yields when toluene is used for obtaining benzonitrile and xylenes are used for obtaining the corresponding mono- and/or dinitriles.

The oxygen necessary for the reaction may be supplied either in a pure state or in admixture with other gases, such as, for example, air.

The latter has the advantage that the nitrogen which accompanies the oxygen serves usefully as a thermal diluent in regards of the exothermic character of the reaction.

Further, and due to the exceptionally high selectivity of the catalysts of this invention, which reduce the strongly exothermic secondary reactions, the use of supplementary diluents in the gaseous mixture fed in may be reduced to minimum values or even omitted altogether.

The quantity of oxygen with respect to the aromatic hydrocarbon used may vary within wide limits.

In a preferred embodiment of the invention, the ratio, expressed in M l. of gas (i.e. measured at 760 mm. Hg of pressure and at 0° C.) during feeding, between the aromatic hydrocarbon and the oxygen is comprised within the range of from 0.003 to 0.33, and preferably from 0.004 to 0.08.

Also, the quantity of ammonia to be used in relation to the aromatic hydrocarbon may vary within wide limits.

However, the preferred ratio between N l. of gaseous aromatic hydrocarbon and N l. of ammonia is within the range of from 0.1 to about 0.5.

Certain gaseous mixtures of aromatic hydrocarbons, oxygen and ammonia, characterized by specific ratios between the components, may behave as inflammable mixtures; and the process of this invention is likewise operative within the limits of said inflammable mixtures.

The reaction affords excellent results both at atmospheric pressures, as well as at superatmospheric pressures.

The reaction temperature is comprised within the range of from 350° C. to 600° C., and preferably from 400° C. to 550° C.

The contact time between the reactants (expressed as the time during which a unit volume of the gaseous mixture fed, measured under the conditions of temperature and pressure existing in the reactor, comes into contact with an apparent unit volume of the catalyst) may vary within very wide limits, for example, from 0.05 to 20 seconds, but preferably the reaction is carried out with contact times comprised in the range of from 1 to 5 seconds, due to the high activity of the catalyst.

The reaction for obtaining the catalyst may be carried out in suitable solvents.

The preferred solvent is water, but it is also possible to use organic solvents containing oxygen and, in particular, alcohols, ethers and esters. The reaction is conducted in the presence of strong mineral acids and, in particular, nitric acid.

According to this invention, it has now been found that in the process for the preparation of the catalyst, it is possible to replace the free heteropolyacid with the corresponding ammonium heteropolysalt, which may be prepared following procedures well known from the literature.

The catalyst may be used without carrier, as well as suitably deposited on a proper carrier.

In order to be used without a carrier, the solution or suspension containing the heteropolysalt, as obtained from the reaction, is evaporated to dryness and the said heteropolysalt is successively activated by heating it at a temperature ranging from 400° C. to 600° for a time ranging from 5 to 20 hours. The temperature of activation should preferably be equal to or greater than the temperature at which the catalyst will have to operate in the process for obtaining the nitriles.

The catalysts according to this invention are preferably used on cariers that will serve to increase the activity and life of the catalyst itself.

Carriers suitable for this purpose may be silicium, alumina, Alundum, fireclays or other similar materials, both in the form of powders of suitable size, as well as in the form of tablets, pellets or granules; the catalyst may be deposited on the carrier either by impregnation of the carrier with a solution of the catalytic substance, and, in this case, it was found convenient to use a microspheroidal silica gel or an aerogel, or by mixing said solution of the catalytic substance with a sol such as, for example, a silica sol (for instance that known under the commercial name of Ludox) and by subsequently drying the same.

To illustrate further the present invention and the advantages thereof, the following specific examples are given, it being understood that these are merely intended to be illustrative and not limitative.

Example 1

A catalyst based on the bismuth salt of cerium-molybdovanadic acid is prepared in the following manner:

30.4 gr. of ammonium paramolybdate are dissolved in 125 cc. of $H_2O$ and the solution is passed over a bed of ion-exchange resin of the Amberlite I.R. 120 type; to the solution thus obtained there are added 11 gr. of sodium metavanadate and this is brought to the boiling point; thereupon a solution of 9 gr. of cerium ammonium nitrate in 100 cc. of water is added drop by drop and the same is filtered after heating for one hour in a reflux column with constant stirring. The filtrate is then concentrated and submitted to an acid extraction with ethyl ether. The ether solution of the heteropolyacid thus obtained is then taken up with water and evaporated until it begins to crystallize.

To 187.57 gr. of the free cerium-molybdo-vanadic acid, dissolved in water, are added 129 gr. of bismuth nitrate dissolved in water acidulated with nitric acid, and 26.8 gr. of an aerogel of silica selected from amongst the types known on the market under the trade names of Aerosil, Cab-o-Sil and Sant-o-Cel.

In a suitable apparatus the obtained mass is then dried by the spray method, thereby directly obtaining the salt in a finely subdivided state, suitable for use as a catalyst in the "fluid bed" technique.

The catalyst thus obtained is then subjected to said activation by heating at a temperature of 530° C. for the duration of about 12 hours. In a reactor operating according to the fluid bed technique, a gaseous mixture comprising toluene, air and ammonia respectively in the following percent volumetric proportions of 8.91%, 82%, 9.09%, is then fed onto the catalyst thus activated and having a particle size comprised within the range of from 100 to 150 mesh.

It is found that the yield in benzonitrile with respect to the starting toluene amounts to 18.3%.

Example 2

In a reactor, operating according to the fluid-bed technique, 25 cc. of a catalyst are used based on the cerium-molybdo-vanadate of bismuth prepared and activated according to Example 1 and having a particle size of between 100 and 150 mesh.

At a constant temperature of 490° C. and for a contact time of 1 second, a gaseous mixture comprising p-xylene, air, ammonia, respectively in the following volumetric percentages of 0.76%, 91.64% and 7.6%, is passed over the catalyst. The feed p-xylene is practically completely converted It is found that the yield in terephthaloylnitrile with with respect to the p-xylene fed amount to 71.8%.

Example 3

In a reactor of 3.6 cm. diameter, operating according to the fluid-bed technique, are employed 60 cc. of a catalyst based on the cerium-molybdo-vanadate of bismuth prepared and activated as described in Example 1 and having a particle size ranging from 80 to 150 mesh.

On this catalyst a gaseous mixture comprising p-xylene, air and ammonia respectively in the following volumetric percentages of 1.66%, 92.1% and 6.24% is passed at a constant temperature of 485° C. and for a contact time of about 0.8 second.

The reaction products, analyzed by the ponderal and the chromatographic method, are constituted by terephthaloylnitrile and toluoylnitrile, and their respective yields referred to the feed p-xylene amount to 44.8% and 29.4%, respectively.

Example 4

A catalyst based on tellurium cerium-molybdate is prepared in the following manner:

To a solution of 300 gr. of ammonium-molybdate in 1000 cc. of $H_2O$, maintained at its boiling point, are added 500 cc. of a 5% solution in $H_2O$ of cerium-ammonium nitrate.

From this a crystalline yellow precipitate is rapidly formed, which, after separation by filtration, is washed, first with an ammonium nitrate solution, and then repeatedly washed with methanol and finally dried in air.

To the product thus obtained, dispersed in 130 cc. of $H_2O$ and 13 cc. of nitric acid, are added 10.1 gr. of telluric acid dissolved in a solution of 91.5 gr. of ammonium-cerium-nitrate in 500 cc. of water and 20 cc. of concentrated nitric acid and 132 gr. of commercial silica gel (such as Aerosil, Cab-o-Sil, Sant-o-Cel).

The resulting mixture is then evaporated, extruded and then dried at 110° C. for about 4 hours.

The catalyst is then subjected to activation by heating in a muffle furnace, at a temperature of 480° C. for about 8 hours.

The catalyst thus prepared and activated in a finely subdivided granulometric size ranging from 100 to 150 mesh, is employed in a reactor operating according to the "fluid-bed" technique.

As gaseous mixture consisting of p-xylene, air and ammonia respectively in the following volumetric percentages of 1.60%, 92.2%, 6.19%, is then passed on 60 cc. of said catalyst for about 2 hours, at a constant temperature of 485° C. and with a contact time of about 1 second.

The yield in terephthaloylnitrile, calculated on the feed p-xylene, amounts to 31.1%: together with the terephthaloylnitrile also para-toluoylnitrile is obtained with a yield of 28.1% with respect to the starting para-xylene.

Example 5

In a reactor operating according to the "fluid-bed" technique, are used 60 cc. of a catalyst based on tellurium cerium-molybdate prepared as in Example 4, having a granulometric size ranging from 80 to 150 mesh.

A mixture of m-xylene, air and ammonia respectively in the following volumetric percentages of: 1.49%, 89.2%, 9.31% is passed for 90 minutes on this catalyst at a constant temperature of 491° C. and with a contact time of about 1 second.

The reaction products, consisting isophthaloylnitrile and meta-toluoylnitrile, show a respective yield of 25.6% and 20% with respect to the feed m-xylene.

What is claimed is:

1. A process for preparing an aromatic nitrile selected from the group consisting of mono- and di-nitriles of benzene and naphthalene, comprising contacting in the gaseous phase at a temperature in the range of 350° to 600° C. and at a contact time of 0.05 to 20 seconds, a mixture comprised of (1) an aromatic hydrocarbon selected from the group consisting of mono- and di-loweralkyl-substituted benzene and mono- and di-lower-alkyl-substituted naphthalene, (2) molecular oxygen, and (3) ammonia, in the presence of (4) a catalytic system comprised of at least one heteropolycompound of the empirical formulae:

and

wherein Me is an element selected from the group consisting of tellurium and bismuth; $x$ is a number ranging from between 1 and 10; $y$ is a number ranging from between 1 and 8; and $w$ is a number ranging from between 38 and 82.

2. The process of claim 1 wherein the temperature is from between 400° C. and 500° C. and the contact time is from between 1 and 5 seconds.

3. The process of claim 1, wherein toluene is employed as the aromatic hydrocarbon.

4. The process of claim 1, wherein p-xylene is employed as the aromatic hydrocarbon.

5. The process of claim 1 wherein m-xylene is employed as the aromatic hydrocarbon.

6. The process of claim 1, wherein a mixture of xylenes is employed as the aromatic hydrocarbon.

References Cited

UNITED STATES PATENTS

| | | | |
|---|---|---|---|
| 2,450,677 | 10/1948 | Marisic et al. | 260—465 |
| 3,173,957 | 3/1965 | McDaniel et al. | 260—465.3 X |
| 3,226,421 | 12/1965 | Giordano et al. | 260—465.3 |
| 3,370,083 | 2/1968 | Ferlazzo et al. | 260—465.3 |

CHARLES B. PARKER, *Primary Examiner.*

S. T. LAWRENCE, III, *Assistant Examiner.*

U.S. Cl. X.R.

252—467, 462, 461